No. 815,018. PATENTED MAR. 13, 1906.
C. R. HUCKLEBERRY.
BROOM CORN CUTTING MACHINE.
APPLICATION FILED DEC. 31, 1904. RENEWED DEC. 2, 1905.
5 SHEETS—SHEET 1.
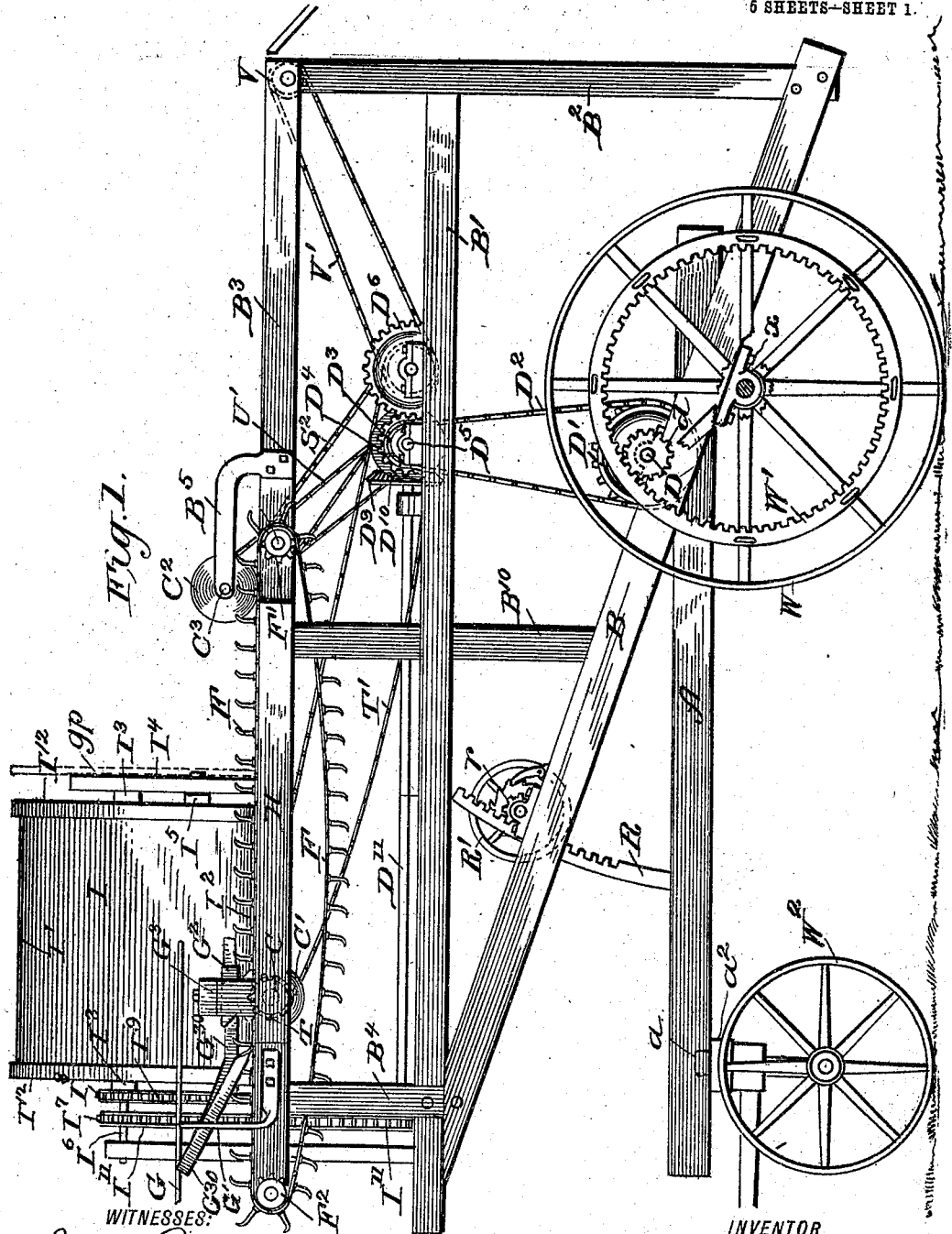
WITNESSES:
Jos. A. Ryan
Edw. W. Byrn
INVENTOR
Charles R. Huckleberry
BY Munn & Co.
ATTORNEYS No. 815,018. PATENTED MAR. 13, 1906.
C. R. HUCKLEBERRY.
BROOM CORN CUTTING MACHINE.
APPLICATION FILED DEC. 31, 1904. RENEWED DEC. 2, 1905.
5 SHEETS—SHEET 2.
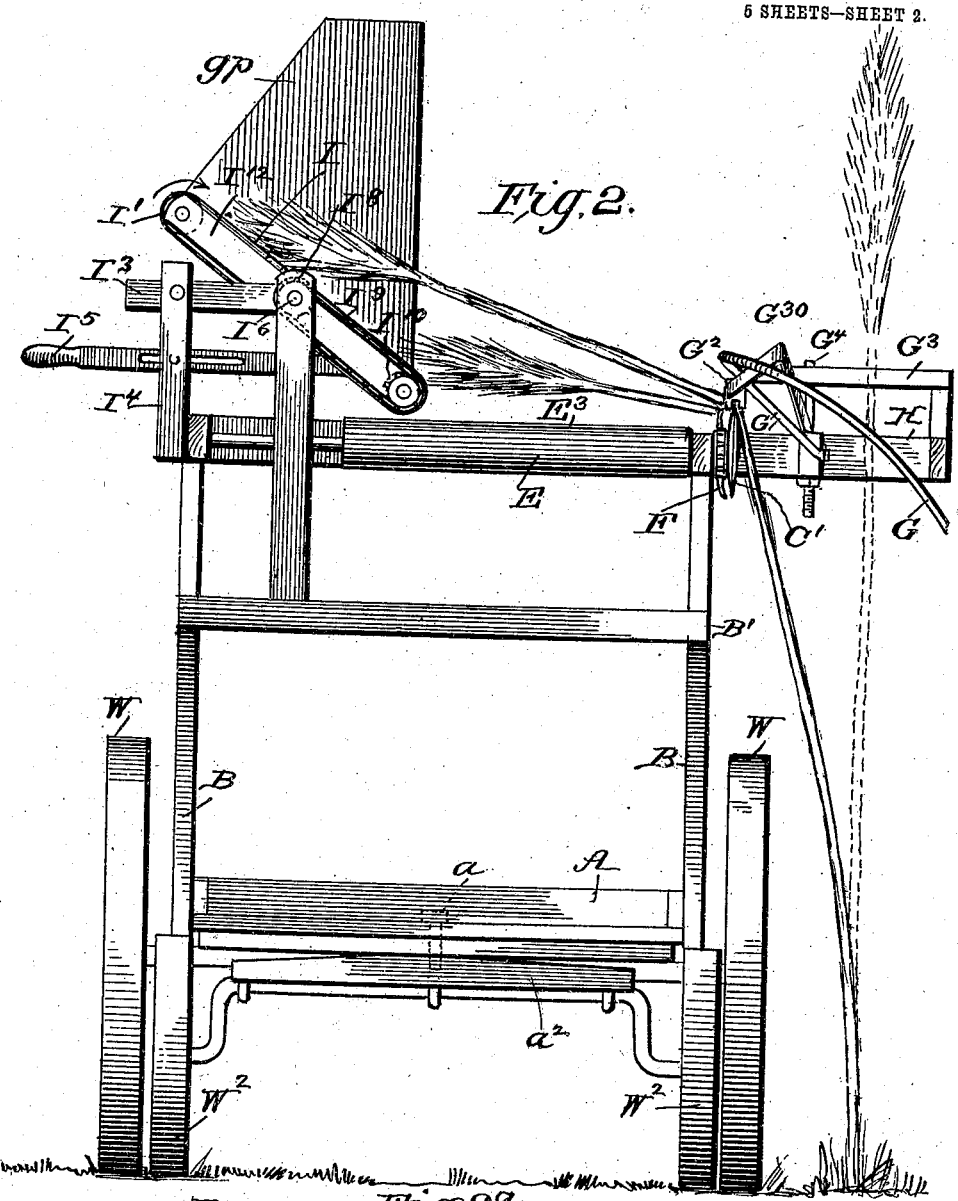
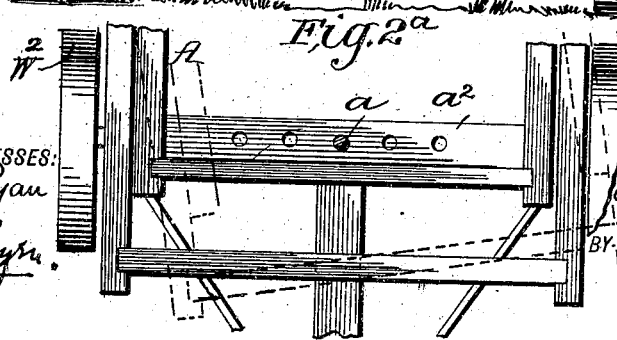
WITNESSES:
Jos. A. Ryan
Edw. W. Byrn
INVENTOR
Charles R. Huckleberry
BY Munn & Co.
ATTORNEYS

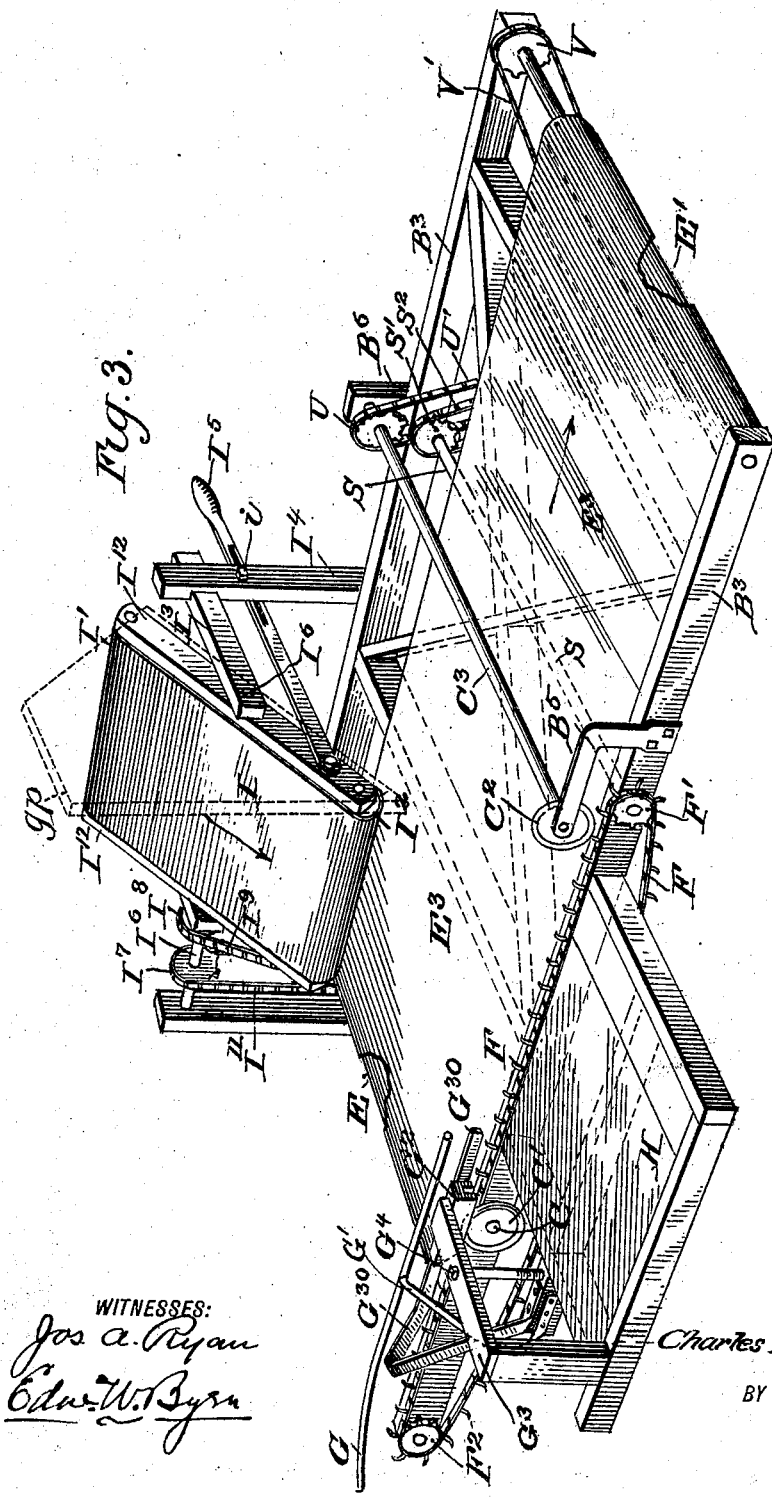

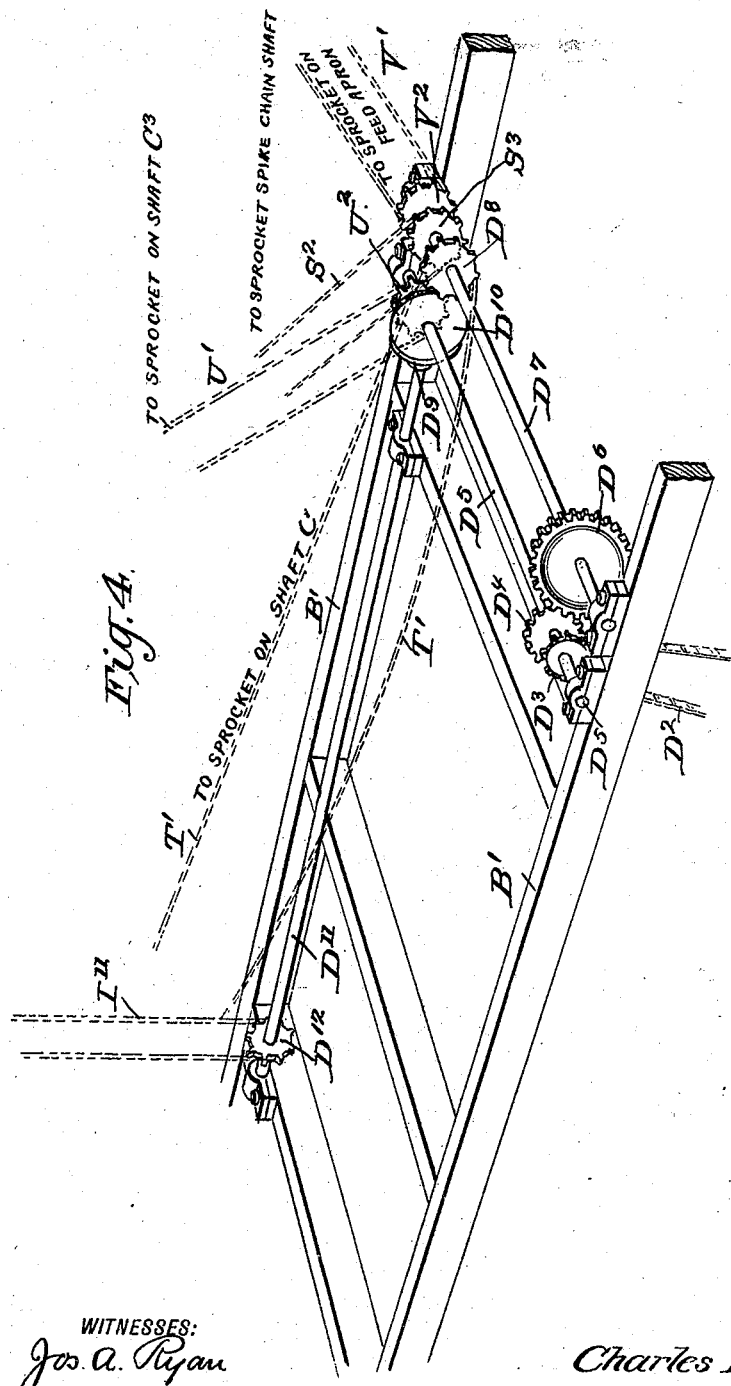

No. 815,018. PATENTED MAR. 13, 1906.
C. R. HUCKLEBERRY.
BROOM CORN CUTTING MACHINE.
APPLICATION FILED DEC. 31, 1904. RENEWED DEC. 2, 1905.
5 SHEETS—SHEET 5.
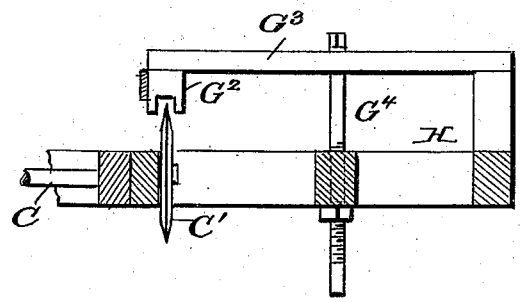
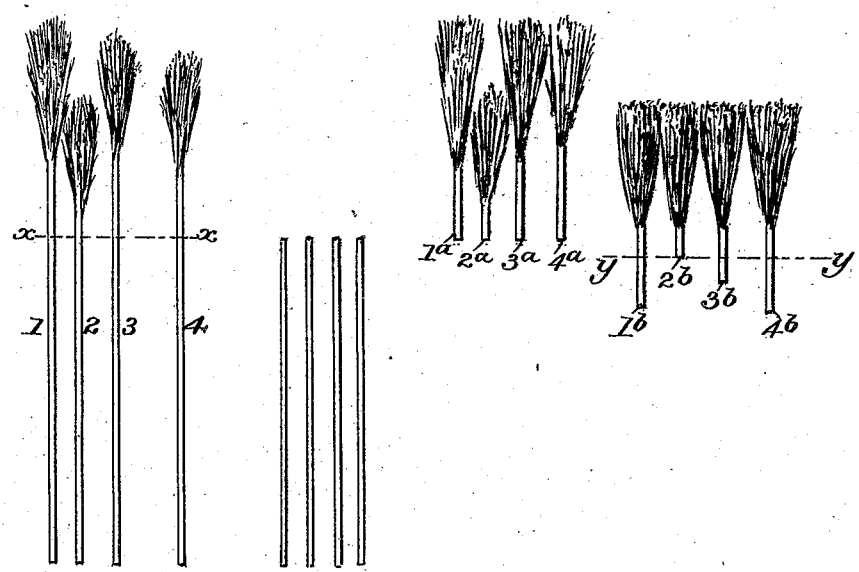
WITNESSES:
Jos. A. Ryan
Edw. W. Byrn
INVENTOR
Charles R. Huckleberry.
BY Munn & Co.
ATTORNEYS

UNITED STATES PATENT OFFICE.

CHARLES R. HUCKLEBERRY, OF PARIS, ILLINOIS.

BROOM-CORN-CUTTING MACHINE.

No. 815,018.
Specification of Letters Patent.
Patented March 13, 1906.

Application filed December 31, 1904. Renewed December 2, 1905. Serial No. 289,981.

*To all whom it may concern:*

Be it known that I, CHARLES R. HUCKLEBERRY, a citizen of the United States, residing at Paris, in the county of Edgar and State of Illinois, have invented a new and useful Improvement in Broom-Corn-Cutting Machines, of which the following is a specification.

Broom-corn is grown in straight rows across the field, and its stalks attain a height of from eight to fourteen feet. These stalks are long and slender and are easily cut. Said stalks, however, vary considerably in height, and in cutting off the brush at the top of the stalk the brush ends vary very much in length. It is very desirable to have the brush ends all of the same length, and my invention is designed to provide a machine which may be drawn across the field by a team to rapidly cut the broom-corn, and which machine is so constructed and arranged as to even the varying lengths of the cut-off brush ends and trim off the superfluous butt-ends of the stalks of the longer brush ends, so as to bring them all to the same length before being delivered to the binder, which binds them in bundles.

My invention consists in a novel construction of automatic machine for doing the above work, which I will now proceed to describe with reference to the drawings, in which—

Figure 1 is a side elevation of the machine. Fig. 2 is a front end elevation, the driving-gears being omitted; Fig. 2$^a$, a detail plan view of the front end of the body-frame. Fig. 3 is a perspective view of the upper part of the machine. Fig. 4 is a perspective view of the intermediate frame with driving-gears. Fig. 5 is a cross-sectional detail showing the first cutting-disk, and Fig. 6 shows in different stages the effect of my machine upon the broom-corn.

In the drawings, Fig. 6, the numerals 1 2 3 4 represent the stalks of broom-corn of varying height as they grow in the row. My machine cuts off the heads or brush ends of these stalks on the line $x\ x$. This it will be seen leaves the severed ends of different lengths, as seen at 1$^a$ 2$^a$ 3$^a$ 4$^a$. These ends are now to have their brushes evened, as seen at 1$^b$ 2$^b$ 3$^b$ 4$^b$, which causes the butt-ends of the stalks to project in an uneven row. These uneven butt-ends are then to be cut off along the line $y\ y$, leaving the brush ends of uniform length to be bound and prepared for the market.

In doing the above-described work my machine comprehends a gatherer for bending over the tops of the broom-corn, so as to bring them in position to be cut, a spiked feed-chain, and an apron for carrying the broom-corn along, a rotary cutter for cutting off the brush ends, an evener-belt for evening the brush ends, and a second rotary cutter for recutting the irregularly-projecting butt-ends of the stalks.

Referring to Figs. 2 and 3, G is a long curved arm which as the machine is drawn down the row strikes against the tops of the stalks of broom-corn in the row and bends the brush ends over to a nearly horizontal position. They are seized in this position by the spikes of the chain F and are carried over the rotary cutter-disk C'. The shorter ends will fall transversely on a traveling belt or apron E$^3$, which moves in the direction of the arrow, and the longer ends fall with their brushes against the evener-belt I. This evener-belt is set at an incline and as its face next to the brushes moves downward it forces these extra long tops down across the belt E$^3$, so that their butt-ends project irregularly on the table H. As the tops pass along on the apron E$^3$ the projecting butt-ends of the longer tops pass under a second rotary cutter-disk C$^2$, which I term a "recutter," and this cuts off the extra length of the butts and leaves the brushes of a practically uniform length lying crosswise of the apron E$^3$, by which they are carried to a binder located at the rear end of the machine, which is of a well-known construction and forms no part of my invention and which need not be shown.

I will now describe more in detail the construction of my machine by which the various parts above described are operated and the machine adjusted to the varying character of the work to be performed.

In the drawings, Figs. 1 and 2, A represents a body-frame which is mounted upon an axle having large driving-wheels W in the rear and upon an axle with smaller wheels W$^2$ in front. The front end of the body-frame has a king-bolt connection $a$ with the platform $a^2$ below it which permits the front wheels to turn. This connection, however, is an adjustable one—that is to say, there is a row of holes in the subjacent bolster, as seen in Fig. 2ᵃ, into any one of which the kingbolt $a$ may be set. This permits the front end of the body-frame and all of the superstructure of the machine to be adjusted laterally, as seen in dotted lines, and set at an angle to the row of broom-corn, so as to let the gathering-arm and cutting mechanism be set closer in to the row of broom-corn, as may be necessary if the corn is small or of dwarf variety.

On the rear axle of the body-frame is mounted the main frame of the machine. This consists (see Fig. 1) of the long inclined bars B, the long vertical bars $B^2$ at the rear, the short vertical bars $B^4$ at the front, middle vertical bars $B^{10}$, the upper horizontal bars $B^3$, and the middle horizontal bars $B'$. All of the working parts of the machine are carried on this main frame, and this entire superstructure is made vertically adjustable at its front end by having the inclined side bars B pivoted at $x$ upon the horizontal axle of the rear wheels, so that the forward or receiving end of the machine can be raised or lowered to suit the height of the broom-corn in the row. For imparting this adjustment to the superstructure curved rack-bars R are mounted on the body-frame A, and with these rack-bars pinions $r$ engage. These pinions are keyed to a transverse shaft arranged in bearings on the inclined bars B, and said shaft is provided with a hand-wheel $R'$ and with a ratchet-and-pawl mechanism by which the superstructure is raised and held to any desired position.

On the inclined bars B near the rear wheels (see Fig. 1) is mounted in bearings a shaft D, bearing a pinion $d$. This pinion engages an internally-toothed wheel $W'$, rigidly fixed to the rear supporting-wheel W, so that the revolution of the wheel W rotates the shaft D through the toothed wheel $W'$ and pinion $d$. On the shaft D is rigidly keyed a gear-wheel $D'$, which through a chain belt $D^2$ drives a small gear-wheel $D^3$ on a shaft $D^5$, (see Fig. 4,) journaled in the middle frame $B'$. Through this shaft $D^5$ all the working parts of the machine are driven, as hereinafter described.

On the upper frame (see Fig. 3) a front and rear roller E and $E'$ are journaled, so as to carry the main apron $E^3$. One of the side bars $B^3$ of the upper frame is extended in front of the front roller and caries a sprocket-wheel $F^2$. Around this sprocket-wheel and another one, $F'$, located about the middle of this upper side bar, a spiked chain belt F is distended. Projecting laterally from the plane of this chain belt and overhanging on that side is a table H. On this table a support $G'$ carries a long bent gathering-arm G. This arm extends longitudinally along the side bar $B^3$ some distance above it and then at its forward end bends outwardly and downwardly. This gathering-arm is intended to strike against the tops of the stalks of broom-corn standing in the row and bend them over to a position above the carrier-apron in position to be cut and dropped on the said apron, as seen in Fig. 2.

Referring to Figs. 1, 2, 3, and 5, $C'$ is a rotary cutter in the form of a sharp-edged disk fixed to a shaft C, journaled in the upper frame, so as to rotate. Just above this cutter is mounted a presser-bar $G^2$, grooved to receive the blade of the cutter-disk and mounted on an arm $G^3$, supported upon the table H. This arm is rendered adjustable, so as to regulate its pressure by a screw $G^4$. As the tops of the broom-corn are bent over by the gathering-arm G they are forced by the guard $G^{30}$ between the cutter $C'$ and the presser-bar $G^2$ above and are cut off. The shorter lengths of the cut-off brushes fall in transverse position on the apron $E^3$, Fig. 2, but the longer lengths lodge with their brush ends against the evener I. This (see Figs. 1 and 3) consists of a broad endless belt arranged in inclined position on the opposite side of the apron from the cutter and leaning outwardly at the top. This belt is distended about an upper roller $I'$ and a lower roller $I^2$, journaled in side bars $I^{12}$. These side arms are hinged upon a shaft $I^6$, carried by horizontal arms $I^3$ on vertical standards $I^4$, rising from the main frame. A slotted handle-bar $I^5$ is connected to the lower end of the evener-frame and is provided with a screw $i$, by which the inclination of the evener may be regulated. The evener-belt is driven from its lower roller by a sprocket-wheel $I^{10}$, Fig. 2, on the shaft of said roller and a chain belt $I^9$, extending to a sprocket-wheel $I^8$ on shaft $I^6$. Another sprocket-wheel $I^7$, Fig. 1, on this shaft is driven by a chain belt $I^{11}$, Fig. 1, which extends down to a sprocket-wheel $D^{12}$ (see Fig. 4) on a longitudinal shaft $D^{11}$, which, through bevel-gears $D^9$ $D^{10}$, is driven from the shaft $D^5$.

Referring now to Figs. 1 and 3, it will be seen that the inclined evener-belt is run so that its face next to the broom-corn is descending, and as the long tops of broom-corn fall against this inclined belt they are shoved downwardly and outwardly until the brush ends are even with the brush ends of the shorter tops on the apron $E^3$, the butt-ends of the longer stalks being forced in an irregular line onto the table H. In this position they are carried to and cut off even by the recutting-disk $C^2$ on the line $y\ y$ of Fig. 6. This disk is arranged above the layer of broom-corn and is fixed to a shaft $C^3$, Fig. 3, journaled in standards $B^5$ $B^6$, one of which, $B^5$, has a horizontally-extended arm at the top.

The recutter $C^2$ is located at the rear edge of the table H, and as the spiked chain carries the row of tops to the recutter the butt-ends are cut off at the moment they pass the rear end of the side table, allowing the cut-off butts to drop. The row of brush ends are now even at both ends and pass along on the carrier-apron E³ to the rear end of the machine, where they are received upon an inclined binder-table of the ordinary construction to be bound into bundles.

For driving the spiked chain F its rear sprocket F' is fixed to a shaft S, Fig. 3, which at the other end carries a sprocket-wheel S', which by means of a chain belt S² (see Fig. 4) extends to a sprocket-wheel S³ on a shaft D⁷, which by means of gear-wheels D⁶ and D⁴ receives motion from the shaft D⁵.

For driving the front cutter-disk C' (see Fig. 1) a sprocket-wheel T on its shaft is driven by a chain belt T', which in turn connects with and is driven (see Fig. 4) by a sprocket-wheel D⁸ on shaft D⁷. For driving the second cutter C², Fig. 3, its shaft C³ has a sprocket-wheel U, that is driven by chain belt U', which (see Fig. 4) receives motion from a sprocket-wheel U² on shaft D⁵. For driving the main apron E³ (see Fig. 3) its rear roller has a sprocket-wheel V, which, through chain belt V', it driven by sprocket-wheel V² (see Fig. 4) on the shaft D⁷.

When extra long or crooked stalks fall upon the evener-belt, they are liable to slip over the rear edge of the evener-belt. To prevent this, I erect at the rear edge of the evener-belt a vertical shield or guard-plate $g\ p$, which holds said stalks on the evener-belt until they are forced down to their proper position. This guard-plate is shown in front view in Fig. 2 and its position is indicated in edge view by dotted lines at $g\ p$ in Fig. 1. This guard-plate may in some cases be dispensed with.

With regard to the distinctive value of the inclined evener-belt when arranged transversely above the carrier and on the opposite side from the cutter I would state that it permits the short stalks to fall away from the long ones, as seen in Fig. 2, and this leaves the long stalks free of frictional entanglement with the short stalks, so that said long stalks may be butted or pushed down endwise without dragging the short ones along with the long ones in the evening process, which is a very important result.

Having thus described my invention, what I claim as new, and desire to secure by Letters Patent, is—

1. A machine for cutting the tops of growing plants, comprising a cutting device, a horizontal endless carrier and an evener-belt arranged transversely to and above the plane of the carrier at an inclination to the same and opposite the cutting device its operating-surface moving toward the cutting device and acting on the heads or brush ends of the cut tops to extend the surplus length of the butt-ends substantially as described.

2. A machine for cutting the tops of growing plants, comprising a cutting device, a carrier, and an evener arranged opposite the cutting devices and acting on the heads or brush ends of the cut tops, said evener being constructed as an endless traveling belt arranged at an incline and geared to move downwardly on the side next to the cutting devices substantially as described.

3. A machine for cutting the tops of growing plants, comprising a cutting device, a carrier, an evener arranged opposite the cutting devices and acting on the heads or brush end of the cut tops, said evener being constructed as an endless traveling belt arranged on axes at right angles to those of the carrier and geared to move downwardly on the side next the cutting devices, and a second cutting device arranged to act upon the butt-ends of the tops after being evened substantially as described.

4. The combination with the carrier, the cutting devices, and the inclined evener-belt arranged above and transversely to the carrier; of a guard arranged in a vertical plane adjacent to and projecting above the edge of the evener-belt on the side of the evener-belt next to the delivery end of the carrier as and for the purpose described.

5. A machine for cutting the tops of growing plants, comprising two rotating cutters, a carrier extending past both cutters and an evener-belt arranged on the opposite side of the carrier from the cutters substantially opposite the space between the cutters to even the heads or brush ends preparatory to trimming their butts, substantially as described.

6. A machine for cutting the tops of growing plants, comprising two rotary cutting devices arranged in vertical planes, a carrier extending past both, an automatic evener arranged on the opposite side of the carrier from the cutters in a position substantially opposite the space between the cutters, and a laterally-projecting table arranged on the other side of the plane of the cutters in a position between the cutters substantially as described.

7. A machine for cutting the tops of growing plants, comprising a curved and laterally-extending gathering-arm, a spiked chain belt, an endless-carrier apron, two rotary cutters, an evener arranged on one side of the plane of the cutters, and a table arranged on the opposite side of the plane of the cutters substantially as described.

8. A machine for cutting the tops of growing plants, comprising cutting devices, a horizontal endless carrier and an evener device composed of an endless belt arranged transversely to and above the plane of the carrier at an inclination to the same and on the opposite side of the carrier from the cutting devices and means for adjusting its inclination substantially as described.

9. A machine for cutting the tops of corn, comprising a wheeled body-frame, an elevated superstructure carrying cutting devices, said superstructure being composed of a framework having inclined bars B horizontally pivoted about the rear axle to give vertical adjustment to the front of the superstructure, and means for adjusting said superstructure arranged between the wheeled body-frame and the said inclined bars as described.

CHARLES R. HUCKLEBERRY.

Witnesses:
J. T. RICKETTS,
A. Y. TROGDON.